April 27, 1926.
R. S. O'NEIL
1,582,424
UNIVERSAL JOINT
Filed Oct. 20, 1924
3 Sheets-Sheet 1
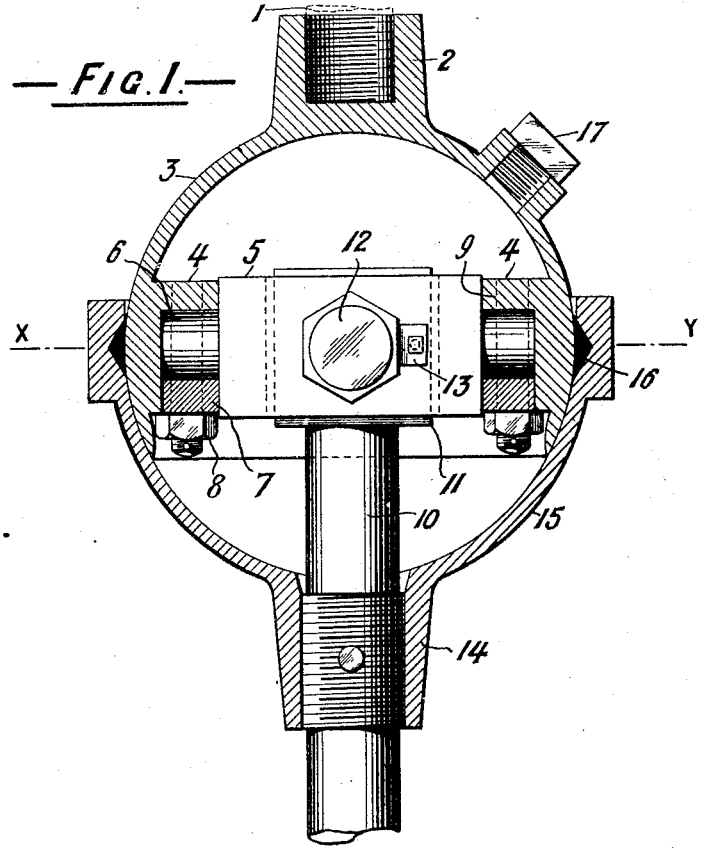
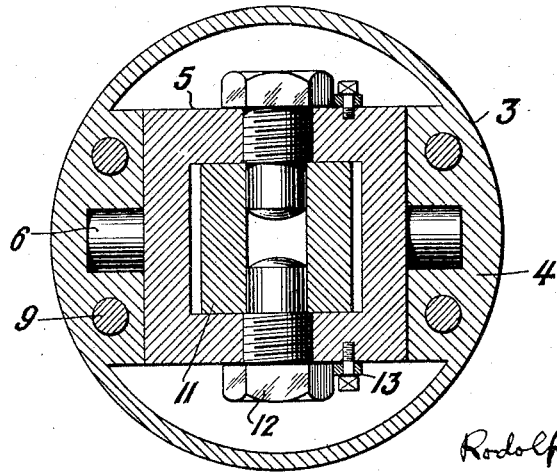

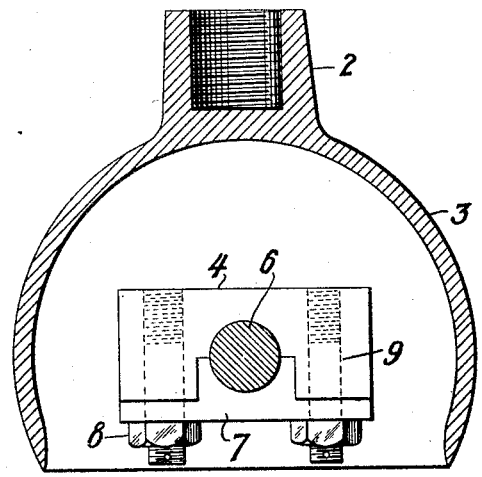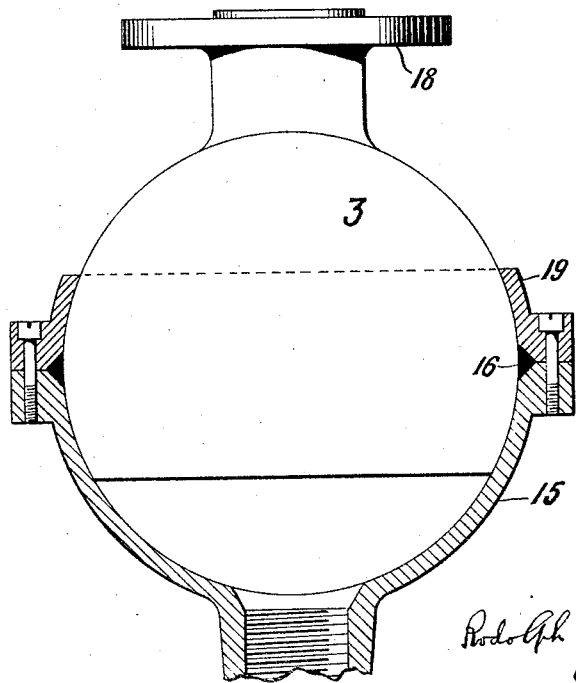

April 27, 1926.
R. S. O'NEIL
UNIVERSAL JOINT
Filed Oct. 20, 1924    3 Sheets-Sheet 3
1,582,424
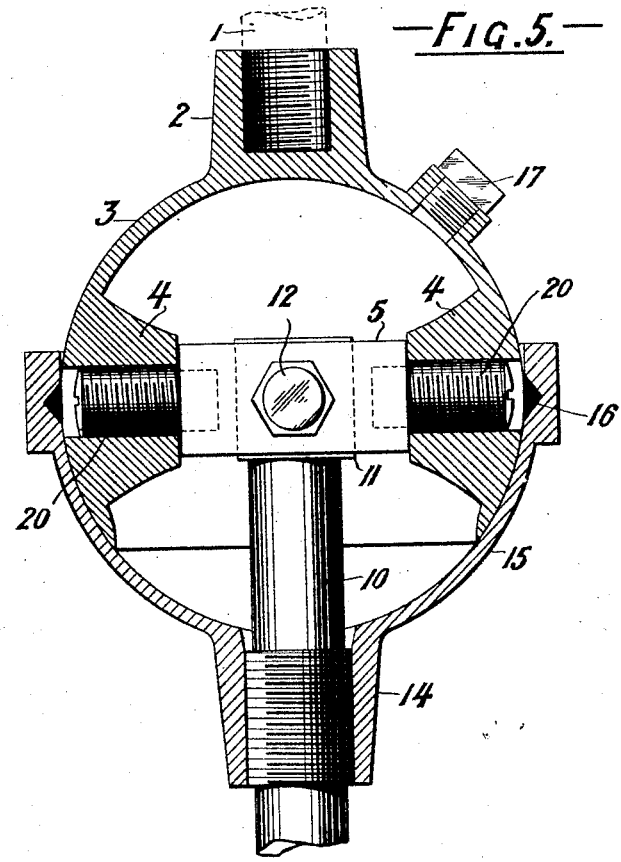
—FIG.5.—
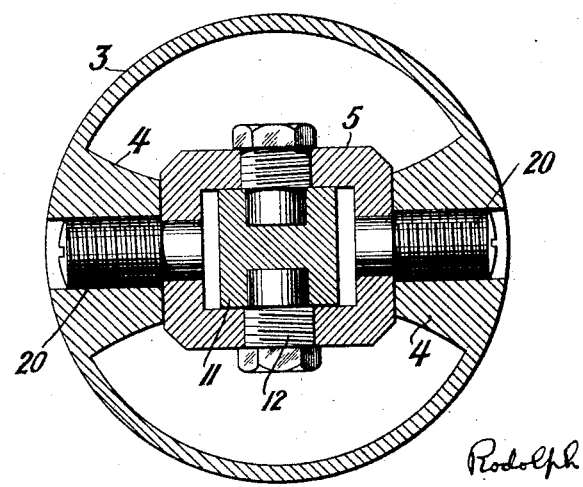
—FIG.6.—

Patented Apr. 27, 1926.

1,582,424

UNITED STATES PATENT OFFICE.

RODOLPH STUART O'NEIL, OF HORTON, ENGLAND.

UNIVERSAL JOINT.

Application filed October 20, 1924. Serial No. 744,621.

*To all whom it may concern:*

Be it known that I, RODOLPH STUART O'NEIL, a subject of the King of Great Britain, residing at Moor Farm, Horton, Buckinghamshire, England, have invented certain new and useful Improvements in Universal Joints, of which the following is a specification.

The present invention refers to a universal joint for connecting two shafts so that they can be driven at considerable angles of divergence, and the said invention has particular reference to that kind of universal joint in which there is a central member in the form of an open rectangular frame which is located between two opposed bearing surfaces of a forked member carried by the first shaft, while a rectangular block carried by the second shaft enters the rectangular opening of the central member or frame, so that the external end faces of the central member or frame are in surface contact with the bearing surfaces of the forked member carried by the first shaft and the internal surfaces of the frame at right angles to the aforesaid external surfaces are in surface contact with the block of the second shaft whereby the torque of the shafts is taken by the contacting flat surfaces and pivot means are used to secure the forked members on the first shaft to the central member and the central member to the block on the second shaft, said pivot means being arranged perpendicular with respect to each other.

Now universal joints of this type have suffered from the defect that while the central portion could be made in the form of a rectangular frame so that the two opposite interior faces were held together and prevented from expanding, yet the member carried by the first shaft and embracing the exterior faces of the rectangular frame were of fork construction, and unless they were made abnormally large and heavy they were always liable to become, under strain, expanded or distanced apart; and moreover such a joint was difficult to enclose so that it could be efficiently protected from dust or dirt and at the same time supplied with lubricant.

Now according to the present invention the member secured to the end of the first shaft instead of being a forked member as heretofore, is in the form of a hollow body open at its end distant from the said shaft and has two internal diametrically opposed inwardly directed projections having spaced opposed parallel bearing faces, so that the said hollow body forms a completely surrounding support to the internal inwardly directed projections which permits the parallel bearing faces of the said projections to be effectively held from spreading with a minimum weight of metal.

An open rectangular frame is located between the bearing faces of the said inwardly directed projections of said hollow body and in surface contact therewith, while a rectangular block carried by a second shaft enters the rectangular opening of said central frame so that the internal surfaces of the frame at right angles to the bearing faces of said projections of said hollow body are in surface contact with said block, each of said bearing faces being relatively large, whereby substantially all of the torque is transmitted through said bearing faces and pivot means are used to secure the rectangular frame to the projections of the hollow body of the first shaft and to secure the block of the second shaft to said frame, said pivot means being arranged perpendicular with respect to each other and merely locating the relative positions of the shafts and not transmitting the power.

This novel construction also provides facility for containing lubricant by constructing the external surface of the hollow body of the first shaft of a spherical contour, and fixing on the second shaft a hollow hemispherical closure member so that the said hemispherical closure member will fit over a portion of the exterior surface of the hollow body of the first shaft. The interior of this casing composed of the hollow body of the first shaft and the hollow hemispherical closure member of the second shaft renders the joint dust-proof and the interior can be packed with and will retain lubricant.

It is obviously essential that the contacting surfaces between the hollow body of the first shaft and the closure member on the second shaft should be spherical, but it will be readily understood that the upper part of the hollow body of the first shaft and the lower part of the closure member of the second shaft need not be spherical.

The invention will be described with reference to the examples of construction shown on the accompanying drawings.

Fig. 1 is a sectional elevation showing one construction of the improved universal joint according to this invention, and Fig. 2 is a horizontal section about the line X—Y of Fig. 1, the hemispherical closure member connected to the second shaft being omitted.

Fig. 3 is a vertical sectional elevation taken at right angles to the plane of the section at Fig. 1, intended particularly to illustrate one of the bearings for the frame trunnions.

Fig. 4 is a sectional elevation showing a modified construction of certain parts hereafter described.

Fig. 5 is a sectional elevation, and Fig. 6 is a horizontal section, showing an alternative construction of the universal joint.

Referring to Figs. 1, 2 and 3 of the drawings, the end of what has been termed the first shaft 1, shown by dotted lines at Fig. 1, is fixed, by screwing or any other suitable means, into a collar 2, from which collar proceeds a hollow body 3 having a spherical external surface not being a complete sphere but greater than a hemisphere, the hollow body being open at its lower end in the position shown in the drawings, and the centre of the spherical hollow body is coincident with the axis of the first shaft 1. The interior of the hollow body is formed with two diametrically opposed inwardly-directed projections 4, the opposed faces of which projections extend at right angles to the axis of the first shaft.

The open frame 5, which at Fig. 2 is shown as rectangular, fits in between the opposed faces of the projections 4, and trunnions 6 proceed from the end faces of the frame 5 and have bearings in the projections 4.

In the construction shown, see particularly Fig. 3, the projections 4 are divided so as to receive the trunnions 6, the cover 7 of the bearing being fixed in position by nuts 8 screwed onto the studs 9 shown by dotted lines.

The second shaft 10 has upon its end a block 11 which passes into the opening of the frame 5, and coaxial bolts 12 passing through the side members of the frame enter a hole drilled through the block 11 and constitute the axis about which the block, and consequently the second shaft 10, can rock. Means such as detents 13, see Figs. 1 and 2, are shown fixed to the frame 5 and retained by screws to prevent any rotation of the heads of the bolts 12.

Onto the second shaft in the construction shown is screwed a collar 14, Fig. 1, from which proceeds a hemispherical closure member 15, which member will fit and contact with a portion of the exterior surface of the hollow body 3 of the first shaft 1, so that the universal joint is rendered dust-proof. To facilitate the exclusion of dust or dirt, the interior edge of the closure member 15 is formed with an annular recess to receive packing 16.

Such a universal joint can be packed with lubricant, and for this purpose a screw plug 17 may be removed for the insertion of the lubricant and be afterwards replaced.

Referring to Fig. 1, it will be understood that it is not essential that the part of the hollow body 3 adjacent the collar 2 should be spherical since the said part might be flat, nor is it essential that the lower portion of the closure member 15 adjacent the collar 14 should be spherical; it is however essential that the contacting surface between the closure member 15 and the hollow body 3 should be spherical.

Obviously instead of the first shaft 1 being screwed into the collar 2 of the hollow body 3, the hollow body 3 may be constructed as shown at Fig. 4, where a flange 18 is provided, onto which a flanged member such as the end of a shaft can be bolted.

Fig. 4 further shows an instance where the closure member 15 is extended so as to be greater than a hemisphere by the fixing to its edge of a ring 19, which also facilitates the securing in position of the packing ring 16.

Figs. 5 and 6 illustrate an example of a slightly modified construction in which, instead of the frame 5 being formed with trunnions, screw pins 20 pass through the interior projections 4 and enter bearings in the ends of the frame 5, the pins being coaxial and the axis of the pins 20 cutting at right angles the axis of the bolts 12 about which the block 11 of the second shaft 10 can rock, and also cutting the centre of the spherical body.

It is to be remarked that the ends of the pins 20 passing through the interior projections 4 of the spherical body are recessed below the exterior surface of the spherical body 3.

It is observed that the frame 5 has an aperture through it greater in dimensions in one direction than the other, and spaces exist in the opening of the frame, between the ends of the frame 5 and the block 11.

What I claim as my invention and desire to secure by Letters Patent is:—

1. A universal joint for connecting two shafts, comprising a hollow body secured to the end of the first shaft, said body having an open end distant from said shaft and having two internal diametrically-opposed inwardly-directed projections directly connected to each other by the completely surrounding support of said hollow body to prevent said projections from spreading, said projections having spaced opposed parallel bearing faces, an open rectangular frame located between and in sliding contact with said two opposed bearing faces of said projections of said hollow body, said rectangular frame having oppositely disposed inwardly-directed bearing faces within its hollow, a rectangular block secured to the second shaft to enter said rectangular frame with its bearing faces in sliding engagement with the inwardly-directed bearing faces of said rectangular frame, each of said bearing faces being relatively large, whereby substantially all of the torque is transmitted through said bearing faces, and pivot means securing said projections of said hollow body to said rectangular frame and said rectangular frame to said rectangular block on said second shaft, said pivot means arranged perpendicular with respect to each other and operating merely to hold said parts with their large bearing faces in proper relation to each other.

2. A universal joint for connecting two shafts, comprising a hollow body having a spherical contour externally secured to the end of the first shaft, said body having an open end distant from said shaft and having two internal diametrically-opposed inwardly-directed projections connected to each other by the completely surrounding support of said hollow body to prevent said projections from spreading, said projections having spaced opposed parallel bearing faces, an open rectangular frame located between and in sliding contact with said two opposed bearing faces of said projections of said hollow body, said rectangular frame having oppositely disposed inwardly-directed bearing faces within its hollow, a rectangular block secured to the second shaft to enter said rectangular frame with its bearing faces in sliding engagement with the inwardly-directed bearing faces of said rectangular frame, each of said bearing faces being relatively large, whereby substantially all of the torque is transmitted through said bearing faces, pivot means securing said inward projections of said hollow body to said rectangular frame and said rectangular frame to said rectangular block on said second shaft, said pivot means arranged perpendicular with respect to each other and operating merely to hold said parts with their large bearing faces in proper relation to each other, and a hollow hemispherical closure member fixed on said second shaft to fit over a portion of the exterior surface of said hollow body of said first shaft to form therewith a closed chamber to exclude dust and to contain lubricant.

In witness whereof I have hereunto set my hand.

RODOLPH STUART O'NEIL.